United States Patent
Chen et al.

(10) Patent No.: US 10,338,949 B2
(45) Date of Patent: Jul. 2, 2019

(54) VIRTUAL TRUSTED PLATFORM MODULE FUNCTION IMPLEMENTATION METHOD AND MANAGEMENT DEVICE

(71) Applicant: Huawei Technologies Co., Ltd., Shenzhen, Guangdong (CN)

(72) Inventors: Dan Chen, Shenzhen (CN); Wei Wang, Shenzhen (CN); Kangkang Shen, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 318 days.

(21) Appl. No.: 15/360,012

(22) Filed: Nov. 23, 2016

(65) Prior Publication Data

US 2017/0075717 A1 Mar. 16, 2017

Related U.S. Application Data

(63) Continuation of application No. PCT/CN2014/089566, filed on Oct. 27, 2014.

(30) Foreign Application Priority Data

May 26, 2014 (CN) .......................... 2014 1 0226504

(51) Int. Cl.
*G06F 9/46* (2006.01)
*G06F 9/455* (2018.01)

(52) U.S. Cl.
CPC .......... *G06F 9/45558* (2013.01); *G06F 9/455* (2013.01); *G06F 2009/4557* (2013.01)

(58) Field of Classification Search
None
See application file for complete search history.

(56) References Cited

U.S. PATENT DOCUMENTS 5,692,193 A * 11/1997 Jagannathan .......... G06F 8/451
711/6
2005/0138370 A1 6/2005 Goud et al.
(Continued)

FOREIGN PATENT DOCUMENTS

CN 101488174 A 7/2009
CN 102110197 A 6/2011
(Continued)

OTHER PUBLICATIONS

Grisenthwaite, "ARMv8 Technology Preview", 2011, 2011 ARM TechCon, Software & Systems Design (Year: 2011).*
(Continued)

*Primary Examiner* — Bradley A Teets

(57) ABSTRACT

A virtual trusted platform module function implementation method is provided, the method is executed at an exception level EL3 of a processor that uses an ARM V8 architecture, and the method includes: generating, according to requirements of one or more VMs, one or more vTPM instances corresponding to each VM, and storing the generated one or more vTPM instances in preset secure space, where each vTPM instance has a dedicated instance communication queue for a VM corresponding to itself to use, and a physical address is allocated to each instance communication queue; and interacting with a VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

8 Claims, 4 Drawing Sheets

(56) References Cited

U.S. PATENT DOCUMENTS

| | | | |
|---|---|---|---|
| 2005/0210467 A1* | 9/2005 | Zimmer | G06F 21/53 |
| | | | 718/1 |
| 2006/0020781 A1 | 1/2006 | Scarlata et al. | |
| 2007/0226786 A1 | 9/2007 | Berger et al. | |
| 2009/0086979 A1 | 4/2009 | Brutch et al. | |
| 2010/0042823 A1* | 2/2010 | Arndt | G06F 21/57 |
| | | | 713/2 |
| 2014/0007087 A1 | 1/2014 | Scott-Nash et al. | |
| 2015/0095633 A1* | 4/2015 | Yao | G06F 21/575 |
| | | | 713/2 |
| 2015/0149751 A1* | 5/2015 | Nemiroff | G06F 21/575 |
| | | | 713/2 |

FOREIGN PATENT DOCUMENTS

| | | |
|---|---|---|
| CN | 103593147 A | 2/2014 |
| CN | 103995732 A | 8/2014 |
| EP | 3139268 A4 * | 8/2017 |
| WO | 2013054528 A1 | 4/2013 |

OTHER PUBLICATIONS

Bucheron et al., "Hardware/Software Support for Securing Virtualization in Embedded Systems", Dec. 15, 2014 (Year: 2014).*
Anonymous: "ARM Cortex-A Series Programmers Guide for ARMv8-A, ARM Cortex—Chapter 12.6. Translations at EL2 and EL3", Jan. 1, 2015, 3 pages, XP055519330.
Cheng, G., et al., "Trusted Lightweight VMM Based Security Architecture," Application Research of Computers, vol. 27, No. 8, Aug. 2010, 5 pages.
"Chapter 3. Fundamentals of ARMv8", In: ARM Cortex-A Series Programmer's Guide for ARMv8-A, Version 1.0, ARM Limited, ARM DEN0024A, ID050815, Mar. 24, 2015, 2 pages.
Chisnall, "6.3 Understanding Shared Memory Ring Buffers", In: The Definitive Guide to the Xen Hypervisor, Chapter 6: Understanding How Xen Approaches Device Drivers, Prentice Hall, Nov. 9, 2007: 5 pages.
Berger et al., "vTPM: Virtualizing the Trusted Platform Module", Proceedings of the 15th USENIX Security Symposium, Jul. 2006, pp. 305-320.

* cited by examiner

VIRTUAL TRUSTED PLATFORM MODULE FUNCTION IMPLEMENTATION METHOD AND MANAGEMENT DEVICE

CROSS-REFERENCE TO RELATED APPLICATIONS

This application is a continuation of International Application No. PCT/CN2014/089566, filed on Oct. 27, 2014, which claims priority to Chinese Patent Application No. 201410226504.5, filed on May 26, 2014, the disclosures of the aforementioned applications are hereby incorporated by reference in their entireties.

TECHNICAL FIELD

Embodiments of the present invention relate to the field of communications technologies, and in particular, to a virtual trusted platform module function implementation method and a management device.

BACKGROUND

A trusted platform module (TPM) technology is proposed by a trusted computing group (TCG), and to prevent an unauthorized user from modifying sensitive data. Because a TPM is used to ensure platform reliability, one operating system platform is corresponding to one independent TPM. In the prior art, the IBM company proposes a vTPM solution, that is, a chip (for example, a security coordination processor) independent of a central processing unit (Central Processing Unit, CPU for short) is used to provide a security feature similar to that of the TPM, and multiple virtual trusted platform modules (virtual Trusted Platform Module, vTPM for short) are obtained by means of virtualization by using software, so that one virtual machine (virtual Machine, VM for short) is corresponding to one vTPM. When an application running on a VM needs to invoke a vTPM command, a corresponding vTPM is accessed by transforming and processing by a proxy (proxy) VM, a security coordination processor drive, and a Hypervisor (Hypervisor), so as to implement trusted execution of multiple virtual machine platforms.

However, in the prior art, each time a vTPM is accessed, transformation and processing need to be performed by using a security coordination processor, which increases a delay and reduces processing efficiency. In addition, during vTPM implementation, a hardware processor needs to be disposed, which enlarges a hardware volume.

SUMMARY

The present invention provides a virtual trusted platform module function implementation method and a management device, which are used to reduce a delay and improve processing efficiency.

According to a first aspect, an embodiment of the present invention provides a vTPM function implementation method, where the method is executed at an exception level EL3 of a processor that uses an ARM V8 architecture, and the method includes:

generating, according to requirements of one or more virtual machines VMs, one or more vTPM instances corresponding to each VM, and storing the generated one or more vTPM instances in preset secure space, where each vTPM instance has a dedicated instance communication queue for a VM corresponding to itself to use, and a physical address is allocated to each instance communication queue; and interacting with a virtual machine monitor VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

In a first possible implementation manner of the first aspect, the interacting with a virtual machine monitor VMM and the VM, so that the VM acquires a VM communication queue virtual address, in VM virtual address space, corresponding to a communication queue physical address of the vTPM instance includes:

sending a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3;

receiving the intermediate physical address sent by the EL2; and sending a second query request to an EL1, where the second query request includes the intermediate physical address, so that the EL1 determines, according to the second query request and a mapping table that is between an intermediate physical address and a virtual address and is stored at the EL1, a virtual address corresponding to the intermediate physical address, where the determined virtual address is the VM communication queue virtual address.

In a second possible implementation manner of the first aspect, the interacting with a virtual machine monitor VMM and the VM, so that the VM acquires a VM communication queue virtual address, in VM virtual address space, corresponding to a communication queue physical address of the vTPM instance includes:

sending a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3, and the EL1 determines, according to the intermediate physical address and a mapping table that is between an intermediate physical address and a virtual address and is stored at the EL1, a virtual address corresponding to the intermediate physical address, where the determined virtual address is the VM communication queue virtual address.

With reference to the first aspect, the first possible implementation manner of the first aspect, or the second possible implementation manner of the first aspect, in a third possible implementation manner of the first aspect, that the VM communicates with a vTPM instance communication queue by using the VM communication queue virtual address includes:

sending, by the VM, a vTPM command to the vTPM instance according to the VM communication queue virtual address by using the vTPM instance communication queue, so that the vTPM instance performs processing according to the vTPM command, and feeds back a processing result to the VM by using the vTPM instance communication queue; and reading, by the VM, the processing result of the vTPM command according to the VM communication queue virtual address by using the vTPM instance communication queue.

According to a second aspect, an embodiment of the present invention provides a vTPM management device, where the vTPM management device executes a vTPM function implementation method at an exception level EL3 of a processor that uses an ARM V8 architecture, and the vTPM management device includes:

a generation unit, configured to generate, according to requirements of one or more virtual machines VMs, one or more vTPM instances corresponding to each VM;

a storage unit, configured to store the generated one or more vTPM instances in preset secure space, where each vTPM instance has a dedicated instance communication queue for a VM corresponding to itself to use, and a physical address is allocated to each instance communication queue; and an interaction unit, configured to interact with a virtual machine monitor VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

In a first possible implementation manner of the second aspect, the interaction unit is specifically configured to: send a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3; receive the intermediate physical address sent by the EL2; and send a second query request to an EL1, where the second query request includes the intermediate physical address, so that the EL1 determines, according to the second query request and a mapping table that is between an intermediate physical address and a virtual address and is stored at the EL1, a virtual address corresponding to the intermediate physical address, where the determined virtual address is the VM communication queue virtual address.

In a second possible implementation manner of the second aspect, the interaction unit is specifically configured to send a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3, and the EL1 determines, according to the intermediate physical address and a mapping table that is between an intermediate physical address and a virtual address and is stored at the EL1, a virtual address corresponding to the intermediate physical address, where the determined virtual address is the VM communication queue virtual address.

According to a third aspect, an embodiment of the present invention provides a vTPM management device, including: a processor based on an ARM V8 architecture and a memory, where the memory stores code required by the processor for running, and the processor is configured to read the code in the memory to execute the following method at an exception level EL3:

generate, according to requirements of one or more virtual machines VMs, one or more vTPM instances corresponding to each VM, and store the generated one or more vTPM instances in preset secure space, where each vTPM instance has a dedicated instance communication queue for a VM corresponding to itself to use, and a physical address is allocated to each instance communication queue; and interact with a virtual machine monitor VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

In a first possible implementation manner of the third aspect, that the processor interacts with the virtual machine monitor VMM and the VM, so that the VM acquires the VM communication queue virtual address, in the VM virtual address space, corresponding to the communication queue physical address of the vTPM instance includes:

sending, by the processor, a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3; receiving the intermediate physical address sent by the EL2; and sending a second query request to an EL1, where the second query request includes the intermediate physical address, so that the EL1 determines, according to the second query request and a mapping table that is between an intermediate physical address and a virtual address and is stored at the EL1, a virtual address corresponding to the intermediate physical address, where the determined virtual address is the VM communication queue virtual address.

In a second possible implementation manner of the third aspect, that the processor interacts with the virtual machine monitor VMM and the VM, so that the VM acquires the VM communication queue virtual address, in the VM virtual address space, corresponding to the communication queue physical address of the vTPM instance includes:

sending, by the processor, a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3, and the EL1 determines, according to the intermediate physical address and a mapping table that is between an intermediate physical address and a virtual address and is stored at the EL1, a virtual address corresponding to the intermediate physical address, where the determined virtual address is the VM communication queue virtual address.

According to the virtual trusted platform module function implementation method and the management device that are provided in the embodiments of the present invention, one or more vTPM instances corresponding to each VM are generated according to requirements of one or more virtual machines VMs, and the generated one or more vTPM instances are stored in preset secure space, where each vTPM instance has a dedicated instance communication queue for a VM corresponding to itself to use, and a physical address is allocated to each instance communication queue; and interaction is performed with a VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address. In the embodiments, a vTPM instance is implemented by using software without disposing a hardware processor, which reduces a hardware volume and costs. In addition, a VM can directly transmit a vTPM command to a vTPM instance by using a communication queue without transforming and processing by a Hypervisor and a proxy VM, which reduces a delay and improves processing efficiency.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
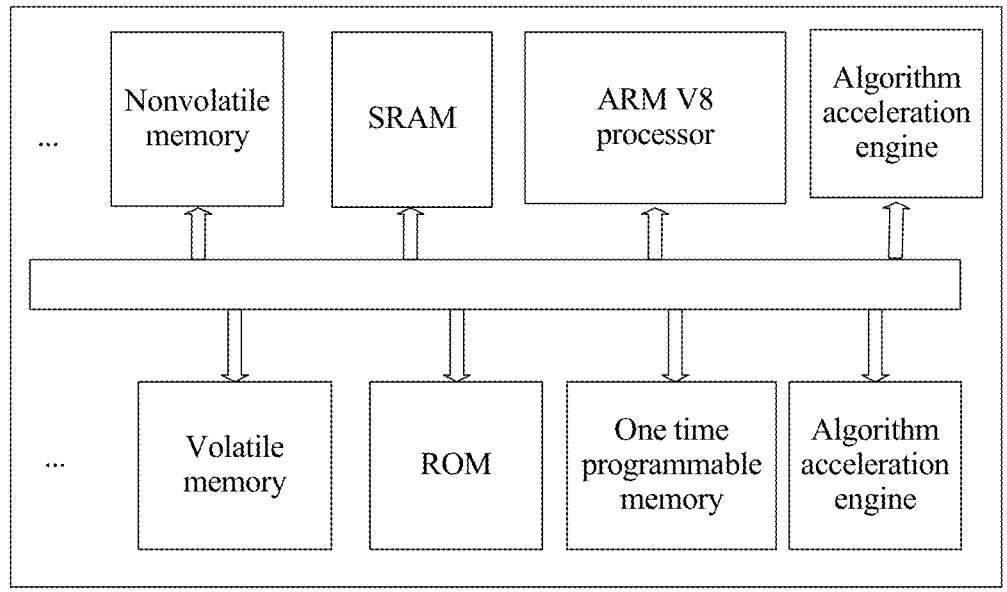
FIG. 1 is a schematic structural diagram of hardware that is based on an ARM V8 processor according to the present invention.

A vTPM management device configured to execute a vTPM function implementation method in the present invention may be integrated into an ARM V8 processor. An application scenario of the ARM V8 processor is shown in FIG. 1. Hardware shown in FIG. 1 includes: the ARM V8 processor, a nonvolatile memory (for example, a Flash), a volatile memory (for example, a DDR), an one time programmable memory (for example, an OTP/FUST), an algorithm acceleration engine (for example, an SEC/RSA), a static random access memory (Static Random Access Memory, SRAM for short), and a read-only memory (Read-Only Memory, ROM for short). The ARM V8 processor is configured for master control. The volatile memory and the nonvolatile memory are respectively configured to store data that loses in power outage and data that does not lose in power outage. The one time programmable memory is configured to store data that is unchangeable and confidential. The algorithm acceleration engine provides algorithms for various encryption and decryption operations. The hardware shown in FIG. 1 may further include devices (not shown in the figure) such as a display controller and a keyboard. It should be noted that the ARM V8 processor is a processor based on an ARM V8 architecture.

Figure 2:
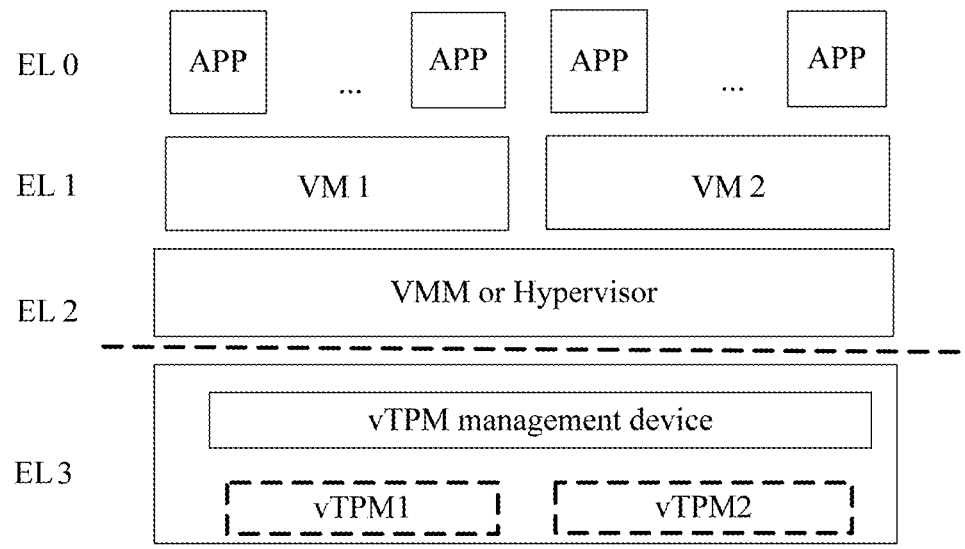
FIG. 2 is a schematic diagram of an ARM V8 architecture according to the present invention.

FIG. 2 is a schematic diagram of an ARM V8 architecture according to the present invention. As shown in FIG. 2, in the ARM V8 architecture, an exception level (Exception Level, EL for short) concept is proposed, and a running phase is divided into an EL0 to an EL3. An application (Application, APP for short) runs at the EL0, a VM runs at the EL1, a virtual machine monitor (virtual Machine Monitor, VMM for short) or a Hypervisor (monitor) runs at the EL2, and a vTPM management device (manager) and a vTPM run at the EL3. The EL3 has a highest permission and has a highest-level security feature. Software at the EL3 first runs when a CPU is powered on, and software at other levels may enter the EL3 after exception occurs. It should be noted that the vTPM function implementation method provided in the present invention is executed at the EL3 of the processor that uses the ARM V8 architecture. The processor may enter the EL3 by configuring some registers, which is the prior art, and details are not described herein again.

Figure 3:
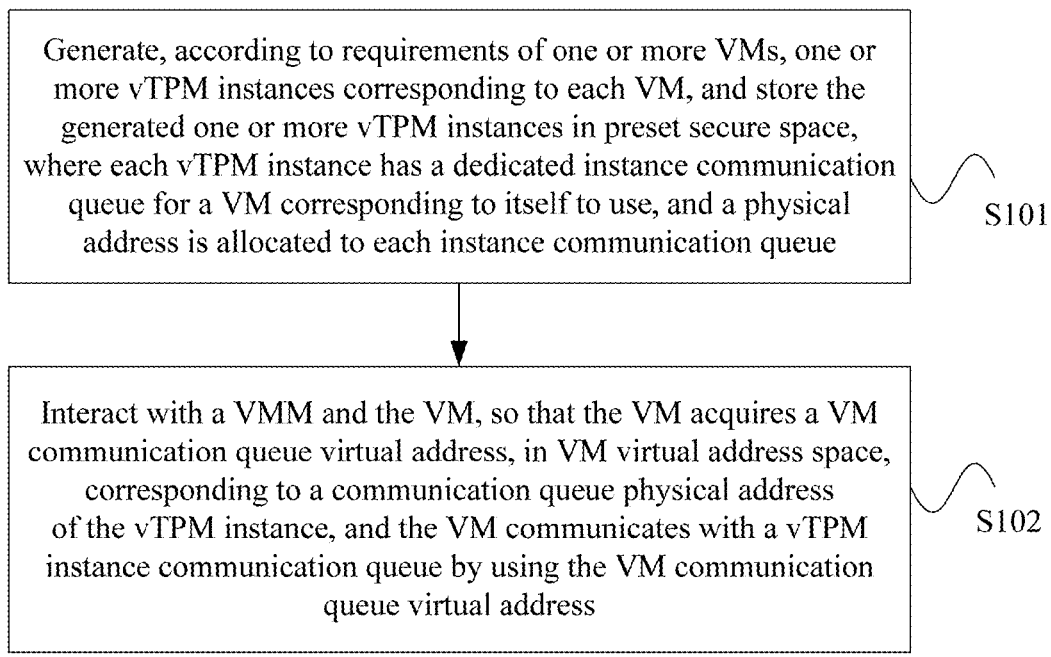
FIG. 3 is a flowchart of Embodiment 1 of a vTPM function implementation method according to the present invention.

FIG. 3 is a flowchart of Embodiment 1 of a vTPM function implementation method according to the present invention. As shown in FIG. 3, this embodiment is executed by a vTPM management device, the vTPM management device executes the vTPM function implementation method at an EL3 of a processor that uses an ARM V8 architecture, and the method in this embodiment may include:

S101. Generate, according to requirements of one or more VMs, one or more vTPM instances corresponding to each VM, and store the generated one or more vTPM instances in preset secure space, where each vTPM instance has a dedicated instance communication queue for a VM corresponding to itself to use, and a physical address is allocated to each instance communication queue.

In this embodiment, after the one or more VMs are established, each VM delivers a requirement of the VM. Therefore, the vTPM management device (manager) receives the requirements delivered by the one or more VMs, and then the vTPM management device generates, according to the received requirements of the one or more VMs, the one or more vTPM instances corresponding to each VM, that is, each generated vTPM instance is in one-to-one correspondence with a VM. Because a process of generating a vTPM instance is executed inside a processor, a dedicated TPM hardware chip does not exist. The vTPM instance is a software TPM, but a function of the vTPM is similar to a hardware TPM, for example, both the vTPM and the hardware TPM implement a function, such as data encryption and decryption, that is defined in a TPM. Then, the generated vTPM instance is stored in the preset secure space, that is, the vTPM management device may simulate a hardware TPM by using a vTPM instance implemented by only software, to implement a TPM function. In this way, there may be no need to specially dispose a hardware processor to implement the TPM function, which reduces a hardware volume and costs. In addition, the generated vTPM instance is stored in the preset secure space. Because the EL3 in the ARM V8 architecture has a highest-level security feature, and secure space configuration is supported in the ARM V8 architecture, the vTPM manager may configure some memory space to have a security attribute, and the memory space runs at the EL3. That is, the vTPM manager configures preset secure space, or sets some registers as to-be-configured preset secure space, and then stores the vTPM instance in the configured preset secure space, so that the vTPM instance may be protected by using a security feature inside the processor, the vTPM instance is not likely to be intercepted and damaged by malicious code, and security is improved.

In this embodiment, after the vTPM manager generates the vTPM instance, each vTPM instance has a dedicated instance communication queue for a VM corresponding to itself to use, and a physical address is allocated to each instance communication queue.

It is assumed that two VMs exist in an ARM V8 processor, which are respectively a VM1 and a VM2. If two vTPM instances are needed to correspond to the VM1, and three vTPM instances are needed to correspond to the VM2, five vTPM instances may be generated. Two vTPM instances are corresponding to the VM1, and three vTPM instances are corresponding to the VM2. For example, a vTPM instance 1 and a vTPM instance 3 are corresponding to the VM1, and a vTPM instance 2, a vTPM instance 4, and a vTPM instance 5 are corresponding to the VM2. The vTPM instance 1 provides a dedicated instance communication queue (for example, an instance communication queue 1) for the VM1 to use, the vTPM instance 2 provides a dedicated instance communication queue (for example, an instance communication queue 2) for the VM2 to use, the vTPM instance 3 provides a dedicated instance communication queue (for example, an instance communication queue 3) for the VM1 to use, the vTPM instance 4 provides a dedicated instance communication queue (for example, an instance communication queue 4) for the VM2 to use, and the vTPM instance 5 provides a dedicated instance communication queue (for example, an instance communication queue 5) for the VM2 to use. An instance communication queue is used for communication between a vTPM instance and a VM.

S102. Interact with a VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

Figure 4:
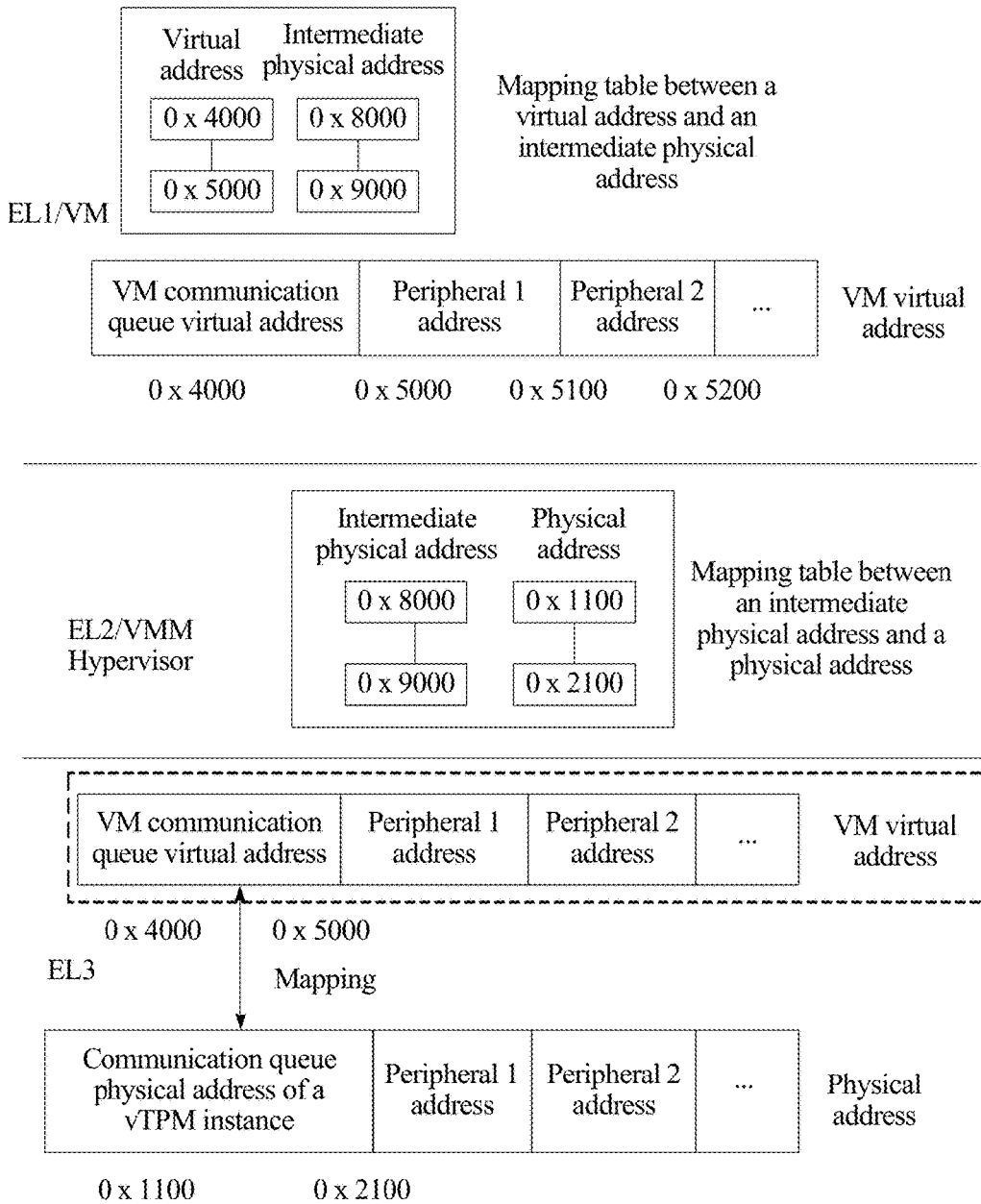
FIG. 4 is a schematic diagram of an application scenario of a vTPM function implementation method according to the present invention.

FIG. 4 is a schematic diagram of an application scenario of a vTPM function implementation method according to the present invention. As shown in FIG. 4, a mapping table between an intermediate physical address and a physical address is stored at an EL2, that is, the mapping table between an intermediate physical address and a physical address in FIG. 4. For example, a physical address 0x1100 maps to an intermediate physical address 0x8000, and a physical address 0x2100 maps to an intermediate physical address 0x9000. A mapping table between a virtual address and an intermediate physical address is stored at an EL1, that is, the mapping table between a virtual address and an intermediate physical address in FIG. 4. For example, the intermediate physical address 0x8000 maps to a virtual address 0x4000, and the intermediate physical address 0x9000 maps to a virtual address 0x5000.

Based on the foregoing stored mapping tables, after the EL3 allocates the communication queue physical address of the vTPM instance, a mapping relationship between a physical address and a virtual address may be finally obtained by inverse deduction step by step by using the foregoing two mapping tables. As shown in an EL3 in FIG. 4, a dashed box is used to identify a virtual address corresponding to a physical address.

Specifically, the mapping relationship between a physical address and a virtual address may be obtained in the following manners.

In a first feasible implementation manner, the interacting with a virtual machine monitor VMM and the VM, so that the VM acquires a VM communication queue virtual address, in VM virtual address space, corresponding to a communication queue physical address of the vTPM instance includes: sending a first query request to the EL2, where the first query request includes the communication queue physical address of the vTPM instance, so that the EL2 determines, according to the first query request and the mapping table that is between a physical address and an intermediate physical address and is stored at the EL2, an intermediate physical address corresponding to the communication queue physical address of the vTPM instance, and sends the intermediate physical address to the EL3; receiving the intermediate physical address sent by the EL2; and sending a second query request to the EL1, where the second query request includes the intermediate physical address, so that the EL1 determines, according to the second query request and the mapping table that is between an intermediate physical address and a virtual address and is stored at the EL1, a virtual address corresponding to the intermediate physical address, where the determined virtual address is the VM communication queue virtual address.

Specifically, a communication queue physical address of each vTPM instance may be learned in advance at the EL3. That the communication queue physical address of the vTPM instance is 0x1100 is used as an example. 0x1100 is carried in the first query request, and the first query request may be sent to the EL2 by using a query interface between the EL3 and the EL2, where a VMM/Hypervisor is located at the EL2, and the first query request is used to request an intermediate physical address mapped by 0x1100. The EL2 determines, according to the physical address 0x1100 and the mapping table between a physical address and an intermediate physical address, that the intermediate physical address mapped by 0x1100 is 0x8000, and then returns the determined intermediate physical address to the EL3. Therefore, the vTPM management device in this embodiment may receive the intermediate physical address 0x8000 sent by the EL2, add the received 0x8000 to the second query request, and send the second query request to the EL1 by using a query interface between the EL3 and the EL1, where the second query request is used to request a virtual address mapped by 0x8000. The EL1 determines, according to the intermediate physical address 0x8000 and the mapping table between an intermediate physical address and a virtual address, that the virtual address mapped by 0x8000 is 0x4000. Because the VM is located at the EL1, the VM may determine that the VM communication queue virtual address, in the VM virtual address space, corresponding to the communication queue physical address 0x1100 of the vTPM instance is 0x4000.

In a second feasible implementation manner, the interacting with a virtual machine monitor VMM and the VM, so that the VM acquires a VM communication queue virtual address, in VM virtual address space, corresponding to a communication queue physical address of the vTPM instance includes: sending a first query request to the EL2, where the first query request includes the communication queue physical address of the vTPM instance, so that the EL2 determines, according to the first query request and the mapping table that is between a physical address and an intermediate physical address and is stored at the EL2, an intermediate physical address corresponding to the communication queue physical address of the vTPM instance, and sends the intermediate physical address to the EL3; and the EL1 determines, according to the intermediate physical address and the mapping table that is between an intermediate physical address and a virtual address and is stored at the EL1, a virtual address corresponding to the intermediate physical address, where the determined virtual address is the VM communication queue virtual address.

Specifically, a communication queue physical address of each vTPM instance may be learned in advance at the EL3. That the communication queue physical address of the vTPM instance is 0x2100 is used as an example. 0x2100 is carried in the first query request, and the first query request may be sent to the EL2 by using a query interface between the EL3 and the EL2, where the first query request is used to request an intermediate physical address mapped by 0x2100. The EL2 determines, according to the physical address 0x2100 and the mapping table between a physical address and an intermediate physical address, that the intermediate physical address mapped by 0x2100 is 0x9000, then adds the determined intermediate physical address 0x9000 to the second query request, and may send the second query request to the EL1 by using a query interface between the EL2 and the EL1, where the second query request is used to request a virtual address mapped by 0x9000. The EL1 determines, according to the intermediate physical address 0x9000 and the mapping table between an intermediate physical address and a virtual address, that the virtual address mapped by 0x9000 is 0x5000. Because the VM is located at the EL1, the VM may determine that the VM communication queue virtual address, in the VM virtual address space, corresponding to the communication queue physical address 0x2100 of the vTPM instance is 0x5000.

Optionally, that the VM communicates with the vTPM instance communication queue by using the VM communication queue virtual address includes: sending, by the VM, a vTPM command to the vTPM instance according to the VM communication queue virtual address by using the vTPM instance communication queue, so that the vTPM instance performs processing according to the vTPM command, and feeds back a processing result to the VM by using the vTPM instance communication queue; and reading, by the VM, the processing result of the vTPM command according to the VM communication queue virtual address by using the vTPM instance communication queue.

In this embodiment, after each VM acquires a VM communication queue virtual address, in VM virtual address space, corresponding to a communication queue physical address of a vTPM instance corresponding to each VM, the VM may communicate with the vTPM instance communication queue by using the VM communication queue virtual address. Therefore, a transmitted vTPM command does not need to be transformed and processed.

Specifically, the VM may send the vTPM command to the vTPM instance according to the communication queue virtual address by using the vTPM instance communication queue, so that the vTPM instance performs processing according to the vTPM command, and feeds back the processing result to the VM by using the vTPM instance communication queue; and the VM reads the processing result of the vTPM command according to the vTPM instance communication queue virtual address by using the vTPM instance communication queue. For example, the VM1 may send a vTPM command to the vTPM instance 1 according to a communication queue virtual address of the VM1 corresponding to the vTPM instance 1 by using a vTPM instance 1 communication queue. After receiving the vTPM command, the vTPM instance 1 performs processing according to the vTPM command, and feeds back a processing result to the VM1 by using the vTPM instance 1 communication queue. The VM1 reads the processing result of the vTPM command according to the VM1 communication queue virtual address by using the vTPM instance 1 communication queue. The VM2 may send a vTPM command to the vTPM instance 2 according to a communication queue virtual address of the VM2 corresponding to the vTPM instance 2 by using a vTPM instance 2 communication queue. After receiving the vTPM command, the vTPM instance 2 performs processing according to the vTPM command, and feeds back a processing result to the VM2 by using the communication queue provided by the vTPM instance 2. The VM2 reads the processing result of the vTPM command according to the VM2 communication queue virtual address by using the vTPM instance 2 communication queue. The processing result of the vTPM command may be a result of encrypting sensitive data or a decryption result, which is not limited in this embodiment.

According to the vTPM function implementation method provided in this embodiment of the present invention, one or more vTPM instances corresponding to each VM are generated according to requirements of one or more virtual machines VMs, and the generated one or more vTPM instances are stored in preset secure space, where each vTPM instance has a dedicated instance communication queue for a VM corresponding to itself to use, and a physical address is allocated to each instance communication queue; and interaction is performed with a VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address. In this embodiment, a vTPM instance is implemented by using software without disposing a hardware processor, which reduces a hardware volume and costs. In addition, a VM can directly transmit a vTPM command to a vTPM instance by using a communication queue without transforming and processing by a Hypervisor and a proxy VM, which reduces a delay and improves processing efficiency.

Figure 5:
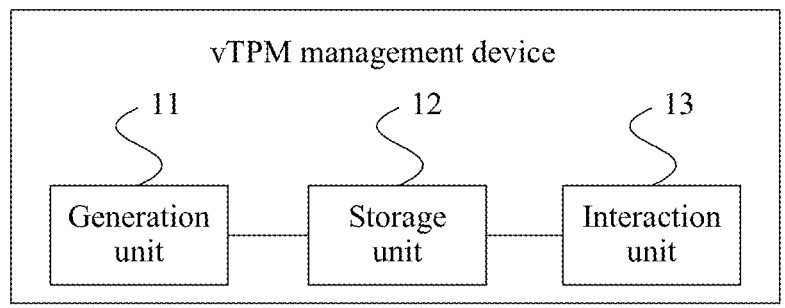
FIG. 5 is a schematic structural diagram of Embodiment 1 of a vTPM management device according to the present invention.

FIG. 5 is a schematic structural diagram of Embodiment 1 of a vTPM management device according to the present invention. As shown in FIG. 5, the vTPM manager in this embodiment executes a vTPM function implementation method at an EL3 of a processor that uses an ARM V8 architecture. The vTPM manager in this embodiment may include: a generation unit 11, a storage unit 12, and an interaction unit 13. The generation unit 11 is configured to generate, according to requirements of one or more virtual machines VMs, one or more vTPM instances corresponding to each VM. The storage unit 12 is configured to store the generated one or more vTPM instances in preset secure space, where each vTPM instance has a dedicated instance communication queue for a VM corresponding to itself to use, and a physical address is allocated to each instance communication queue. The interaction unit 13 is configured to interact with a virtual machine monitor VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

Optionally, the interaction unit 13 is specifically configured to send a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3; receive the intermediate physical address sent by the EL2; and send a second query request to an EL1, where the second query request includes the intermediate physical address, so that the EL1 determines, according to the second query request and a mapping table that is between an intermediate physical address and a virtual address and is stored at the EL1, a virtual address corresponding to the intermediate physical address, where the determined virtual address is the VM communication queue virtual address.

Optionally, the interaction unit 13 is specifically configured to send a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3, and the EL1 determines, according to the intermediate physical address and a mapping table that is between an intermediate physical address and a virtual address and is stored at the EL1, a virtual address corresponding to the intermediate physical address, where the determined virtual address is the VM communication queue virtual address.

The vTPM manager in this embodiment may be used to execute the technical solutions in the foregoing method embodiment of the present invention, and implementation principles and technical effects of the vTPM manager are similar to those in the method embodiment and are not described herein again.

Figure 6:
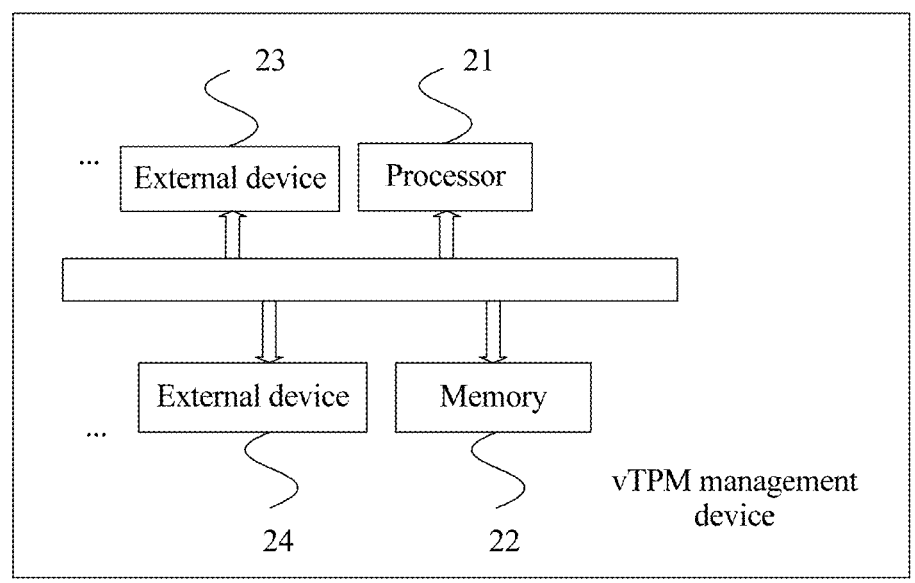
FIG. 6 is a schematic structural diagram of Embodiment 2 of a vTPM management device according to the present invention.

FIG. 6 is a schematic structural diagram of Embodiment 2 of a vTPM management device according to the present invention. As shown in FIG. 6, the vTPM management device in this embodiment may include a processor 21 and a memory 22, where the processor 21 is a processor based on an ARM V8 architecture. The processor 21 and the memory 22 may be connected by using a bus. The vTPM management device in this embodiment may further include some external devices, such as an external device 23 and an external device 24. The memory 22 stores code required by the processor 21 for running, and the processor 21 is configured to read the code in the memory 22 to execute the following method at an exception level EL3:

generate, according to requirements of one or more virtual machines VMs, one or more vTPM instances corresponding to each VM, and store the generated one or more vTPM instances in preset secure space, where each vTPM instance has a dedicated instance communication queue for a VM corresponding to itself to use, and a physical address is allocated to each instance communication queue; and interact with a virtual machine monitor VMM and the VM, so that the VM acquires a VM communication queue virtual address, in VM virtual address space, corresponding to a communication queue physical address of the vTPM instance, and the VM communicates with a vTPM instance communication queue by using the VM communication queue virtual address.

Optionally, that the processor 21 interacts with the virtual machine monitor VMM and the VM, so that the VM acquires the VM communication queue virtual address, in the VM virtual address space, corresponding to the communication queue physical address of the vTPM instance includes:

sending, by the processor 21, a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3; receiving the intermediate physical address sent by the EL2; and sending a second query request to an EL1, where the second query request includes the intermediate physical address, so that the EL1 determines, according to the second query request and a mapping table that is between an intermediate physical address and a virtual address and is stored at the EL1, a virtual address corresponding to the intermediate physical address, where the determined virtual address is the VM communication queue virtual address.

Optionally, that the processor 21 interacts with the virtual machine monitor VMM and the VM, so that the VM acquires the VM communication queue virtual address, in the VM virtual address space, corresponding to the communication queue physical address of the vTPM instance includes:

sending, by the processor 21, a first query request to an EL2, where the first query request includes the communication queue physical address of the vTPM instance, so that the EL2 determines, according to the first query request and a mapping table that is between a physical address and an intermediate physical address and is stored at the EL2, an intermediate physical address corresponding to the communication queue physical address of the vTPM instance, and sends the intermediate physical address to the EL3, and the EL1 determines, according to the intermediate physical address and a mapping table that is between an intermediate physical address and a virtual address and is stored at the EL1, a virtual address corresponding to the intermediate physical address, where the determined virtual address is the VM communication queue virtual address.

The vTPM management device in this embodiment may be used to execute the technical solutions in the foregoing method embodiment of the present invention, and implementation principles and technical effects of the vTPM management device are similar to those in the method embodiment and are not described herein again.

A person of ordinary skill in the art may understand that all or some of the steps of the method embodiment may be implemented by program instructing relevant hardware. The program may be stored in a computer-readable storage medium. When the program runs, the steps of the method embodiment are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A virtual trusted platform module (vTPM) function implementation method for use at an exception level EL3 of a processor that uses an ARM V8 architecture, the method comprising:
   generating, according to requirements of one or more virtual machines (VMs), one or more vTPM instances corresponding to each VM, and storing the generated one or more vTPM instances in preset secure space, wherein each vTPM instance has a dedicated instance communication queue for a VM corresponding to itself to use, and a physical address is allocated to each instance communication queue; and
   interacting with a virtual machine monitor (VMM) and the VM, for causing the VM to acquire a VM communication queue virtual address, in VM virtual address space, corresponding to a communication queue physical address of the vTPM instance, by:
      sending a first query request to an EL2, wherein the first query request comprises the communication queue physical address of the vTPM instance, for causing the EL2 to determine, according to the first query request and a mapping table that is between a physical address and an intermediate physical address and is stored at the EL2, an intermediate physical address corresponding to the communication queue physical address of the vTPM instance, and send the intermediate physical address to the EL3;
      receiving the intermediate physical address sent by the EL2; and
      sending a second query request to an EL1 wherein the second query request comprises the intermediate physical address, for causing the EL1 to determine, according to the second query request and a mapping table that is between an intermediate physical address and a virtual address and is stored at the EL1 a virtual address corresponding to the intermediate physical address,
   wherein the determined virtual address is the VM communication queue virtual address, and
   wherein the VM communicates with a vTPM instance communication queue by using the VM communication queue virtual address.

2. The method according to claim 1, further comprising:
   sending, by the VM, a vTPM command to the vTPM instance according to the VM communication queue virtual address by using the vTPM instance communication queue, for causing the vTPM instance to process the vTPM command, and feed back a processing result to the VM by using the vTPM instance communication queue; and
   reading, by the VM, the processing result of the vTPM command according to the VM communication queue virtual address by using the vTPM instance communication queue.

3. A virtual trusted platform module (vTPM) function implementation method for use at an exception level EL3 of a processor that uses an ARM V8 architecture, the method comprising:
   generating, according to requirements of one or more virtual machines (VMs), one or more vTPM instances corresponding to each VM, and storing the generated one or more vTPM instances in preset secure space, wherein each vTPM instance has a dedicated instance communication queue for a VM corresponding to itself to use, and a physical address is allocated to each instance communication queue;
   interacting with a virtual machine monitor (VMM) and the VM, for causing the VM to acquire a VM communication queue virtual address, in VM virtual address space, corresponding to a communication queue physical address of the vTPM instance, by sending a first query request to an EL2,
   wherein the first query request comprises the communication queue physical address of the vTPM instance, for causing the EL2 to determine, according to the first query request and a mapping table that is between a physical address and an intermediate physical address and is stored at the EL2, an intermediate physical address corresponding to the communication queue physical address of the vTPM instance, and send the intermediate physical address to the EL1,
   wherein the EL1 determines, according to the intermediate physical address and a mapping table that is between an intermediate physical address and a virtual address and is stored at the EL1, a virtual address corresponding to the intermediate physical address, and
   wherein the determined virtual address is the VM communication queue virtual address and the VM communicates with a vTPM instance communication queue by using the VM communication queue virtual address.

4. The method according to claim 3, further comprising:
   sending, by the VM, a vTPM command to the vTPM instance according to the VM communication queue virtual address by using the vTPM instance communication queue, for causing the vTPM instance to process the vTPM command, and feed back a processing result to the VM by using the vTPM instance communication queue; and
   reading, by the VM, the processing result of the vTPM command according to the VM communication queue virtual address by using the vTPM instance communication queue.

5. A virtual trusted platform module (vTPM) management device for executing a vTPM function implementation method at an exception level EL3 of a processor that uses an ARM V8 architecture, the vTPM management device comprising:
   a generation unit, configured to generate, according to requirements of one or more virtual machines (VMs), one or more vTPM instances corresponding to each VM;
   a storage unit, configured to store the generated one or more vTPM instances in preset secure space, wherein each vTPM instance has a dedicated instance communication queue for a VM corresponding to itself to use, and a physical address is allocated to each instance communication queue; and an interaction unit, configured to:
  interact with a virtual machine monitor (VMM) and the VM, for causing the VM to acquire a VM communication queue virtual address, in VM virtual address space, corresponding to a communication queue physical address of the vTPM instance;
  send a first query request to an EL2, wherein the first query request comprises the communication queue physical address of the vTPM instance, for causing the EL2 to determine, according to the first query request and a mapping table that is between a physical address and an intermediate physical address and is stored at the EL2, an intermediate physical address corresponding to the communication queue physical address of the vTPM instance, and send the intermediate physical address to the EL3;
  receive the intermediate physical address sent by the EL2; and
  send a second query request to an EL1 wherein the second query request comprises the intermediate physical address, for causing the EL1 to determine, according to the second query request and a mapping table that is between an intermediate physical address and a virtual address and is stored at the EL1 a virtual address corresponding to the intermediate physical address,
wherein the determined virtual address is the VM communication queue virtual address, and
wherein VM communicates with a vTPM instance communication queue by using the VM communication queue virtual address.

6. A virtual trusted platform module (vTPM) management device for executing a vTPM function implementation method at an exception level EL3 of a processor that uses an ARM V8 architecture, the vTPM management device comprising:
  a generation unit, configured to generate, according to requirements of one or more virtual machines (VMs), one or more vTPM instances corresponding to each VM;
  a storage unit, configured to store the generated one or more vTPM instances in preset secure space, wherein each vTPM instance has a dedicated instance communication queue for a VM corresponding to itself to use, and a physical address is allocated to each instance communication queue; and
  an interaction unit, configured to:
    interact with a virtual machine monitor (VMM) and the VM, for causing the VM to acquire a VM communication queue virtual address, in VM virtual address space, corresponding to a communication queue physical address of the vTPM instance; and
    send a first query request to an EL2, wherein the first query request comprises the communication queue physical address of the vTPM instance, for causing the EL2 to determine, according to the first query request and a mapping table that is between a physical address and an intermediate physical address and is stored at the EL2, an intermediate physical address corresponding to the communication queue physical address of the vTPM instance, and send the intermediate physical address to the EL1,
wherein the EL1 determines, according to the intermediate physical address and a mapping table that is between an intermediate physical address and a virtual address and is stored at the EL1 a virtual address corresponding to the intermediate physical address,
wherein the determined virtual address is the VM communication queue virtual address, and
wherein VM communicates with a vTPM instance communication queue by using the VM communication queue virtual address.

7. A virtual trusted platform module (vTPM) management device, comprising:
  a memory configured to store code: and
  a processor based on an ARM V8 architecture and configured to execute the stored code in the memory to cause the vTPM management device, at an exception level EL3, to:
    generate, according to requirements of one or more virtual machines (VMs), one or more vTPM instances corresponding to each VM, and store the generated one or more vTPM instances in preset secure space, wherein each vTPM instance has a dedicated instance communication queue for a VM corresponding to itself to use, and a physical address is allocated to each instance communication queue;
    interact with a virtual machine monitor(VMM) and the VM, for causing the VM to acquire a VM communication queue virtual address, in VM virtual address space, corresponding to a communication queue physical address of the vTPM instance;
  send a first query request to an EL2, wherein the first query request comprises the communication queue physical address of the vTPM instance, for causing the EL2 to determine, according to the first query request and a mapping table that is between a physical address and an intermediate physical address and is stored at the EL2, an intermediate physical address corresponding to the communication queue physical address of the vTPM instance, and send the intermediate physical address to the EL3;
  receive the intermediate physical address sent by the EL2; and
    send a second query request to an EL1 wherein the second query request comprises the intermediate physical address, for causing the EL1 to determine, according to the second query request and a mapping table that is between an intermediate physical address and a virtual address and is stored at the EL1 a virtual address corresponding to the intermediate physical address,
    wherein the determined virtual address is the VM communication queue virtual address, and
    wherein the VM communicates with a vTPM instance communication queue by using the VM communication queue virtual address.

8. A virtual trusted platform module (vTPM) management device, comprising:
  a memory configured to store code: and
  a processor based on an ARM V8 architecture and configured to execute the stored code in the memory to cause the vTPM management device, at an exception level EL3, to:
    generate, according to requirements of one or more virtual machines (VMs), one or more vTPM instances corresponding to each VM, and store the generated one or more vTPM instances in preset secure space, wherein each vTPM instance has a dedicated instance communication queue for a VM corresponding to itself to use, and a physical address is allocated to each instance communication queue;

interact with a virtual machine monitor (VMM) and the VM, for causing the VM to acquire a VM communication queue virtual address, in VM virtual address space, corresponding to a communication queue physical address of the vTPM instance; and send a first query request to an EL2, wherein the first query request comprises the communication queue physical address of the vTPM instance, for causing the EL2 to determine, according to the first query request and a mapping table that is between a physical address and an intermediate physical address and is stored at the EL2, an intermediate physical address corresponding to the communication queue physical address of the vTPM instance, and send the intermediate physical address to the EL1, wherein the EL1 determines, according to the intermediate physical address and a mapping table that is between an intermediate physical address and a virtual address and is stored at the EL1, a virtual address corresponding to the intermediate physical address, wherein the determined virtual address is the VM communication queue virtual address, and wherein the VM communicates with a vTPM instance communication queue by using the VM communication queue virtual address.

* * * * *